I

United States Patent
Smith

(10) Patent No.: US 8,272,835 B2
(45) Date of Patent: Sep. 25, 2012

(54) CLEARANCE ARRANGEMENT

(75) Inventor: Colin D. Smith, Uttoxeter (GB)

(73) Assignee: Rolls-Royce PLC, London (GB)

( * ) Notice: Subject to any disclaimer, the term of this patent is extended or adjusted under 35 U.S.C. 154(b) by 605 days.

(21) Appl. No.: 12/453,995

(22) Filed: May 28, 2009

(65) Prior Publication Data

US 2010/0003125 A1   Jan. 7, 2010

(30) Foreign Application Priority Data

Jul. 7, 2008   (GB) .................................. 0812306.9

(51) Int. Cl.
*F01D 25/24* (2006.01)
*F04B 49/00* (2006.01)

(52) U.S. Cl. ..................... 415/126; 417/275; 192/85.63; 192/85.59

(58) Field of Classification Search ................. 415/126, 415/275

See application file for complete search history.

(56) References Cited

U.S. PATENT DOCUMENTS 5,056,988 A * 10/1991 Corsmeier et al. ......... 415/173.2
2006/0021833 A1* 2/2006 Runkel ......................... 188/314
2008/0011577 A1* 1/2008 Burkhart et al. ............ 192/85 R

FOREIGN PATENT DOCUMENTS

| DE | 102 40 334 A1 | 3/2004 |
| EP | 0 808 991 A2 | 11/1997 |
| EP | 1 467 066 A2 | 10/2004 |
| GB | 2 063 374 A | 6/1981 |
| GB | 2 363 864 A | 1/2002 |
| WO | WO 2007/129401 A1 | 11/2007 |

* cited by examiner

*Primary Examiner* — Matthew W Such
*Assistant Examiner* — David Spalla
(74) *Attorney, Agent, or Firm* — Oliff & Berridge, PLC

(57) ABSTRACT

A gas turbine engine comprising of a turbine blade, an adjustable casing, and a clearance control arrangement. The clearance control arrangement further comprises an actuator operatively connected to a piston within a cylinder wherein the piston divides the cylinder by a sealing engagement with a wall of the cylinder into a first volume and a second volume. The first volume is operatively connected to a first piezo electric pump that increases a pressure in the first volume, and the second volume is operatively connected to a second piezo electric pump that increases a second pressure in the second volume, such that the relative displacement of the piston is determined by a pressure balance between the first and second pressure.

11 Claims, 2 Drawing Sheets

CLEARANCE ARRANGEMENT

The present invention relates to clearance arrangements and more particularly to clearance arrangements utilised within gas turbine engines to provide clearance adjustment between a rotating component and a casing.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

As will be appreciated with regard to a gas turbine engine close association between the rotating parts such as compressor fan blades and turbine blades improves efficiency by reducing leakage through the gap between the rotating blade and the surrounding casing. In such circumstances arrangements are provided for clearance control.

It is known to reduce the dimensions of a turbine casing when that casing would otherwise increase beyond a reasonable level due to thermal expansion. For example, predefined running turbine tip clearances are defined for operational efficiency of the engine such that if the turbine casing expands due to heating beyond this running clearance a valve opens to supply compressor air to the turbine casing such that the casing contracts and therefore a tighter running clearance is achieved.

Expansion, and reduction in clearance, occurs for a number of reasons in addition to those resulting from thermal changes. For example, a turbine blade may increase in length due to centrifugal force. As an engine increases in speed and spins faster the blades grow radially outward causing the tips to approach a surrounding casing. It will also be appreciated on occasions during a flight cycle the tips of blades can actually contact a surrounding turbine casing causing impact between the blades and the casing despite thermal expansion of that casing. It will be understood such contact will reduce the life of a turbine blade. Basic techniques with regard to tip clearance for a blade in terms of cooling of the turbine blade can on occasions be insufficient in terms of reaction time and in any event it is difficult to maintain an accurate running tip clearance.

It will be understood that components within an engine may be specified for a particular condition. One such condition is for stable cruise operation of an engine in an aircraft. Such stable conditions are when the turbine casing is thermally expanded to a stable point and the turbine blades are spinning at a fairly constant speed and therefore have a stable length. At this stable stage a running clearance can be specified for efficiency but generally in view of the necessity of operating the engine from an initial cool state the initial running clearance will result in clearances greater than 1.5 mm occurring leading to significant inefficiencies in engine performance such as more fuel being burnt than really necessary.

More specific closed loop control of the rotating or blade clearance to a casing would be advantageous but the additional costs as well as weight and size for associated valves and pipework to utilise bleed air would generally be unacceptable with conventional arrangements.

UK patent publication number 2063374A illustrates a clearance arrangement in which an actuator associated with an adjustable shroud operates by displacement of a plunger or piston within a cylinder. Displacement of the piston or plunger causes movement of the actuator to adjust casing size. Compressor bleed pressure is utilised to cause the displacement of appropriate valves and to facilitate displacement of the plunger or piston within the cylinder. In such circumstances it will be understood that the engine efficiency is diminished by the compressed air bled from the compressor stages which may not be fully compensated for by the reduction in leakage within the engine. Furthermore, as indicated the necessary valves will add significantly to weight whilst not typically being capable of rapid or fine adjustment.

In accordance with aspects of the present invention there is provided a clearance arrangement for a gas turbine engine, the arrangement comprising an actuator upon a piston within a cylinder, the piston effectively dividing the cylinder by a seal association with a wall of the cylinder into a first volume and a second volume, the first volume and the second volume associated with a respective piezo electric pump to increase the pressure in the respective first volume and the second volume for relative displacement of the piston determined by a pressure balance between the first volume and the second volume, one or both of the first volume and the second volume having a vent valve to release pressure in the respective volume to suspend the pressure balance for direct displacement of the piston by increasing pressure in the first volume or the second volume by the respective piezo electric pump.

Typically, at least one piezo electric pump comprises a piezo ceramic stack operable at a predetermined temperature to pump through a one way valve to the respective volume of the cylinder. Generally, the predetermined temperature is above 450° C.

Generally, the vent valve incorporates a one way valve.

Generally each piezo electric pump includes an inlet and a diaphragm displaceable to compress a fluid such as air for presentation to the respective volume of the cylinder through a pump path. Generally, the pump path has a cross section determined to be in a predetermined ratio with the vent valve cross section to facilitate suspension of the pressure in the associated first or second volume.

Generally, a controller is provided to provide signals to the respective piezo electric pumps to determine operation of each piezo electric pump and the vent valve. Typically, the controller is associated with a sensor for the actuator and/or an associated element displaceable by the actuator whereby the sensor provides an indication of position of the actuator and/or associated element.

Typically, the associated element is part of an adjustable casing or shell for a gas turbine engine within which a rotating element is provided.

Possibly, at least one piezo electric pump is formed from more than one piezo electric stack arranged to act in combination to provide the relative displacement.

Also in accordance with aspects of the present invention there is provided a gas turbine engine incorporating a clearance arrangement as described above.

Figure 1:
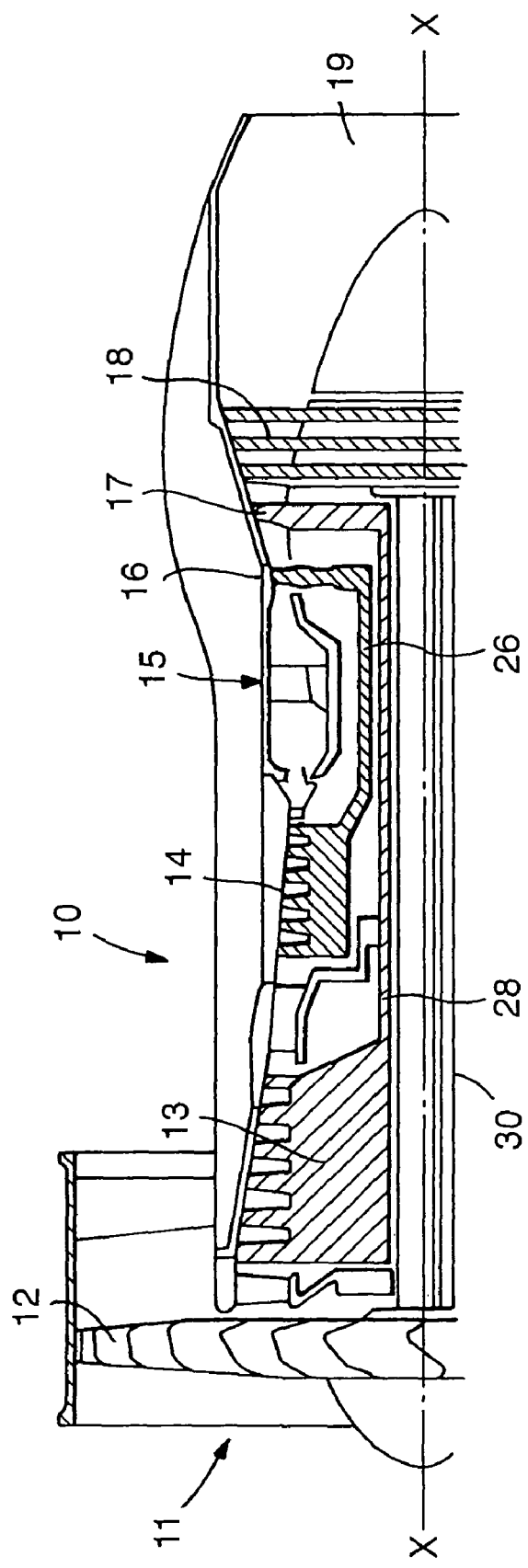
FIG. 1 shows a gas turbine engine generally known in the art.

Embodiments of aspects of the present invention will now be described by way of example and with reference to the accompanying drawing, FIG. 2 providing a schematic illustration of a clearance arrangement in accordance with one aspect of the present invention.

As indicated above closer control of clearance between a rotating component and a casing provides advantages with respect to reduction in leakage particularly with regard to gas turbine engines. Traditional sources (compression flows) for cooling of casings to control thermal growth or to act as actuators for adjusting a casing can reduce operational efficiency. It would be advantageous to provide an independent means for adjusting specifically a casing or other element but provision of dedicated valves and compressor pumps of a traditional nature would as indicated add significantly to weight and cost.

Aspects of the present invention utilise piezo electric pumps typically formed from piezo electric materials which are arranged to operate above a predetermined temperature. It will be understood with regard to a gas turbine engine generally relatively high temperatures are present particularly about turbine stages of such engines. Certain piezo ceramic materials can be formed into pumps which can operate above 450° C. and so provide a basis for pumping. As indicated above advantageously maintaining a running clearance of a predetermined spacing such as 0.25 mm would have particular advantages with regard to gas turbine engines in terms of overall efficiency and reductions in fuel burn.

Piezo ceramic materials have been developed such that the vibration can be utilised in a pump. Piezo ceramic materials can be utilised in two ways. Firstly, when squashed or displaced these piezo ceramic materials will output a small electrical current but alternatively and generally more usefully when electrical current is applied the ceramic material will displace and typically extend in the opposite direction to the direction of applied electrical current. This displacement is utilised in accordance with aspects of the present invention as indicated to form a pump. In such circumstances rather than utilising by-passed compressor air from compressor stages of a gas turbine engine specific pressurisation is provided by dedicated piezo electric pumps as required. Aspects of the present invention use ambient or environmental air within a turbine casing.

In use generally an appropriate number of piezo ceramic stacks, that is to say small layers of piezo ceramic material are stacked one upon the other to provide a sufficient overall range of displacement for practicality with regard to acting as a pump. The displacement will flex a small diaphragm in order to create a pumping action through displacement of the diaphragm to increase the pressure within a volume of a cylinder to move a piston. The piston or plunger is pushed down or upwards by relative pressurisation in a first volume and a second volume of the cylinder either side of the piston. The piston is connected generally to an element such as a segment from a gas turbine casing in order to move that casing inward or outwards dependent upon turbine blade tip proximity and in order to facilitate a closer running clearance. It will be understood generally a means for determining clearance and therefore adjustment of the actuator will also be provided such that a controller can vary the arrangement dependent upon particular prevalent conditions at any time or expected conditions.

Typically, each pump will include at least one piezo electric stack but in order to provide a particular operational requirement such as speed of action or redundancy in case of failure of one stack it will be understood two or more piezo electric stacks may be combined in one pump.

In the above circumstances it will be appreciated that the clearance arrangement in accordance with aspects of the present invention provides clearance without any need for levers or beams or utilisation of by-passed compressor air. Accommodation is readily achieved even though typically as will be described later two piezo electric pumps are provided for each casing segment through an appropriate actuator. The pumps, cylinders and pistons are relatively small in size.

Figure 2:
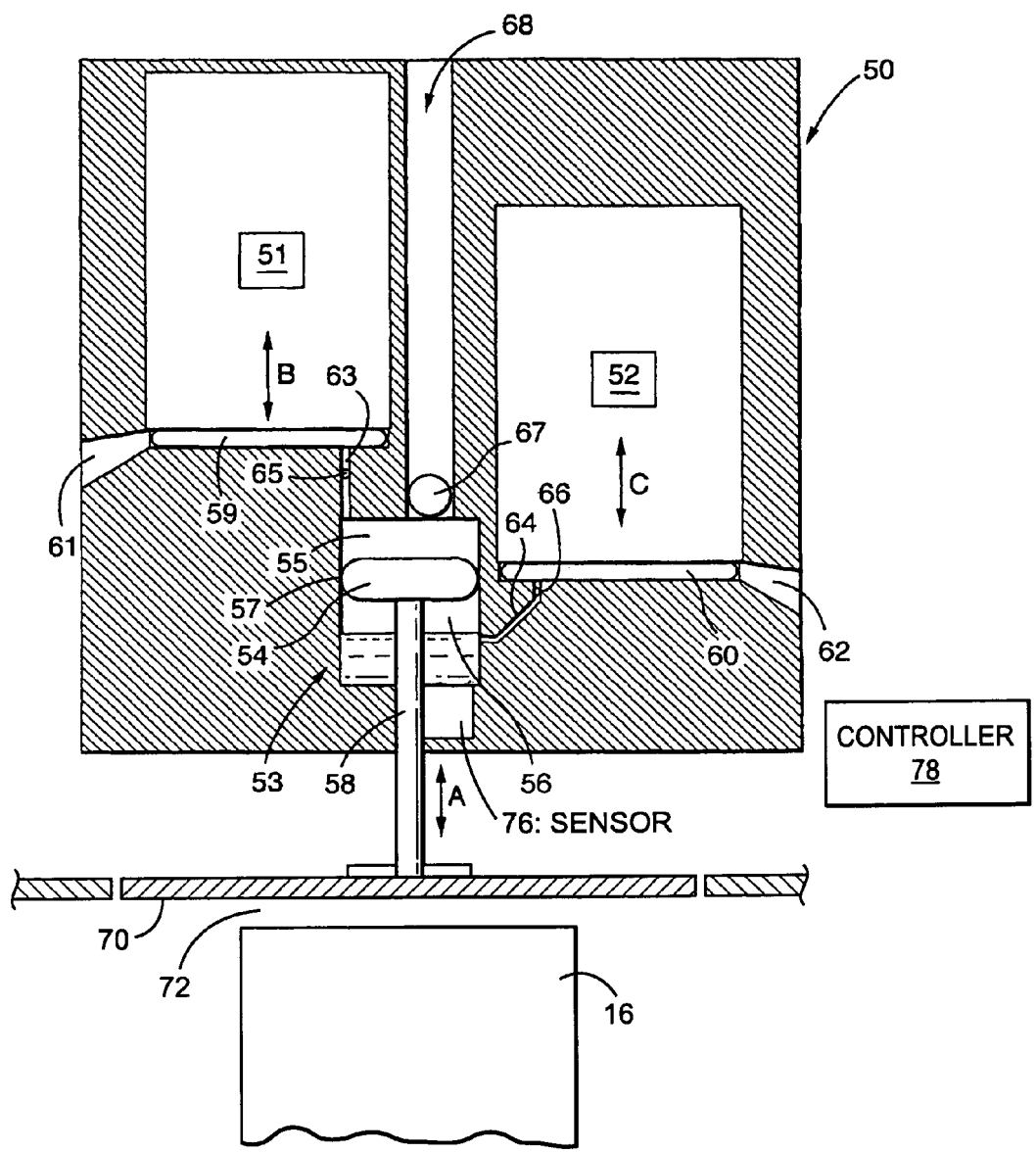
FIG. 2 is a schematic view of a clearance arrangement according to embodiments of the disclosure.

FIG. 2 provides a schematic illustration of a clearance arrangement 50 in accordance with aspects of the present invention. The arrangement 50 comprises respective piezo electric pumps 51, 52 associated with a cylinder 53. The cylinder 53 is essentially divided by a piston 54 into a first volume 55 and a second volume 56. In such circumstances it will be understood that the piston 54 provides and is in substantially a sealing engagement 57 with walls of the cylinder 53. The piston 54 acts as a plunger such that through association with an actuator 58 movement in the direction of arrowheads A can be achieved. Such adjustment in the direction of arrowhead A can advance or retreat an associated element such as a casing segment in a gas turbine engine.

It is by controlling the pressure balance between the first volume 55 and the second volume 56 that displacement in the direction of arrowhead A is provided.

Generally, the piezo electric pumps 51, 52 are of equal size. In such circumstances each pump 51, 52 is enclosed within an outer casing to limit movement of each respective pump to displacements in the direction of arrowheads B, C. In such circumstances movement is with respect to a respective diaphragm 59, 60. Each diaphragm 59, 60 has an inlet 61, 62 through which air is drawn to the respective diaphragm 59, 60 and the air displaced for a pumping action. The pumping actions as a result of the piezo electric operation of the piezo electric ceramic stacks of the pumps 51, 52 acting upon the diaphragms 59, 60 generates compression and therefore fluid flow through pump paths 63, 64 to a respective volume 55, 56. The pumps 51, 52 can generate pressurisation of the volumes 55, 56 either side of the piston 54. It will be understood in view of the respective pressure balance between the volumes 55, 56 the piston in such circumstances will be displaced in the direction of arrowheads A.

In order to achieve pressurisation generally the pump paths 63, 64 incorporate one way valves 65, 66 in order that the compressed fluid, that is to say gas/air, is passed to the cylinder 53 without venting back through the inlets 61, 62.

In terms of an operational cycle it will be appreciated that as indicated fluid in the form of gas/air enters through the inlet 61, 62 either side of the arrangement 50. Typically, initially the piezo electric pump 52 is in a non operational state and therefore stationary whilst piezo electric pump 51 is operating at high speeds and therefore generating fluid flow through the pump path 63 and valve 65 to the first volume 55. This will pressurise the first volume 55. Pumping is achieved by the fluid (gas/air) entering the diaphragm 59 when the piezo electric stack contracts and then squashes and pushes back in compression through the pump path 63 to the volume 55 as the piezo electric stack expands or vice versa. In such circumstances pressure within the volume 55 gradually increases causing as indicated the piston 54 as a plunger to move downwards lowering the actuator 58. By a feedback control system either the position of the actuator 58 or more advantageously the position of an associated element such as a segment from a casing 70 in a gas turbine engine will be determined through an appropriate sensor 76. The sensor will then through a controller 78 adjust the actuator 58 position by altering the relative pressures in the first volume 55 and the second volume 56. Initially as indicated generally the actuator 58 will be moved downwards in order to achieve closer association with typically a rotating component 16. When the clearance 72, that is to say clearance between the rotating component 16 and the associated element such as a casing segment 70, is close enough the piezo electric pump 51 will be stopped while the piezo electric pump 52 will be started. In general the piezo electric pump 52 operates in a similar manner to the piezo electric pump 51 but through its pump path 64 to the second volume 56 pressurisation in the second volume 56 is beneath the piston 54. Thus the pressure balance across the piston 54 will be determinant as to the rate of movement of the piston 54 in use.

As the first volume 55 as indicated is defined between the one way valve 65 and the seal 57 provided between the piston 54 and the cylinder 53 such movement in an upward direction for the actuator 58 may be resisted. In such circumstances in accordance with aspects of the present invention a vent valve 67 is provided.

The vent valve 67 is released allowing the first volume 55 to return to normal ambient pressure rapidly. In such circumstances pressurisation of the second volume 56 is then dependent solely upon the piezo electric pump 52 as the pressure balance between the volumes 55, 56 is effectively suspended by the vent 67 providing an open and unrestricted nature to the first volume 55. Thus, the pressure generated by the second piezo electric pump 52 can rapidly act through pressurisation of the second volume 56, to cause retreat or upward displacement of the actuator 58 in the direction of arrowheads A. Such rapid operation with reduced lag and delay allows more accurate control of the actuator 58 position and therefore positioning of the associated elements such as a casing segment in a gas turbine engine. As indicated the volume 56 acts below the piston 54 in order to cause the displacement of that piston 54 and is therefore associated with the actuator 53.

In the above circumstances it will be appreciated as previously sensors for the actuator 58 and more preferably the associated elements such as a casing segment will be utilised in order to achieve the desired clearance between that element and for example a rotating component. Once a desired separation and clearance is achieved it will be understood that the second piezo electric pump 52 will be stopped by a controller.

In the above circumstances it will be appreciated that the arrangement 50 in accordance with aspects of the present invention allows active and positive control of actuator 58 position and therefore associated elements such as a casing segment in a gas turbine engine. The vent valve 67 is typically also associated with the controller such that it is opened when required to allow rapid and direct utilisation of the second piezo electric pump 52. Thus, pressure balance across the piston 54 can be controlled.

It will be understood that generally the actuator 58 is associated with the piston 54 which is effectively suspended upon the pressure balance across the piston 54 as a result of fluid pressurisation in the first volume 55 and the second volume 56. In such circumstances generally the volumes 55, 56 will be pressurised such that the piston 54 is effectively suspended robustly at a desired displaced position for the actuator 58.

Pressurisation in the respective volumes 55, 56 is achieved through the piezo electric pumps 51, 52 in such circumstances in normal operation as indicated both the volumes 55, 56 may be pressurised in order to robustly present and locate the piston 54. Downward displacement is provided through pressurisation achieved through the first piezo electric pump 51 increasing the pressure in the first volume 55 causing displacement downwards. This pressurisation may be against a base pressure within the second volume 56 to control the rate of displacement. It will be appreciated that progressive and deliberate displacement downwards is advantageous in order to avoid clashing with a rotating component such as a turbine blade. Nevertheless, it will be appreciated that generally the pressurisation within the second volume 56 may decay through leakage or otherwise and furthermore a separate vent valve for the second volume 56 may be provided if required.

Without a vent valve 67 it will be appreciated that the pressurisation in the first volume 55 as indicated is closed between the one way valve 65 and the seal 57 about the piston 54. Thus, retraction or retreat of the piston 54 will again be balanced by the capabilities for pressurisation of the second piezo electric pump 52 and any capability for forced leakage. As the first piezo electric pump 51 and the second piezo electric pump 52 will generally be equivalent it will be understood that the rate of retreat will again be slow. However, it will be understood that such retreat will generally be as a result of the determination of too close a clearance between an element associated with the actuator 58 and a rotating component. In such circumstances more rapid displacement in a reverse direction may be advantageous. As indicated the valve 67 effectively allows suspension of a pressure balance across the piston 54 between the volumes 55, 56. This suspension allows more direct applicability of the pressurisation provided by the second piezo electric pump to lift the actuator 58 through action beneath the piston 54.

The vent valve 67 may be a simple open/close valve therefore effectively opening the first volume 55 to atmosphere and therefore creating an ambient pressure. In such circumstances the relative cross sections of a vent 68 and the available cross section for pump flow through the pump path 64 may be determinant as to potential evacuation of fluid from the first volume 55 and therefore potential rate of displacement of the piston 54 and so the actuator 58. Alternatively, the valve 67 may be progressive in terms of the rate of regulation of fluid flow exit from the first volume 55 again providing a ratio with the potential pumping capacity of the second piezo electric pump 52 into the second volume 56 and so the rate of displacement of the actuator 58. In any event as indicated above generally, the valve 67 will be operated by a controller to open the first volume 58 either fully or progressively to suspend the pressure balance across the piston 54 as described above.

It will be understood that aspects of the present invention provide speed of operation through use of piezo electric ceramics in piezo electric pumps. In such circumstances the rate of change as well as the potential displacement depth created by the piezo ceramics in the piezo electric pumps and so the range of diaphragm displacement can be utilised in order to alter the fluid pumping rates through the pump paths 63, 64 and so the speed with which pressurisation of the respective volumes 55, 56 is achieved. The direct application of pressurisation within the volumes 55, 56 allows more accurate control of displacement of the piston 54 and therefore the actuator 58 along with associated elements such as a casing segment.

It will be understood that generally an arrangement 50 in accordance with aspects of the present invention will be associated with each casing segment in a gas turbine engine. In such circumstances the absolute volume of fluid, that is to say hot gas/air pumped into the cylinder 53 will be relatively small and therefore within the capabilities of piezo electric pumps 51, 52. Furthermore, relatively small pumps 51, 52 in terms of volume, and associated cylinders 53 will be readily located within a gas turbine casing outer circumference.

In the above circumstances a large number of arrangements 50 will be provided and these arrangements 50 may be individually controllable by a controller. Asymmetric and different displacements of the actuators 58 can be achieved at different parts of a casing through respective segments. Such more direct control may have advantageous in some circumstances. Nevertheless through the use of a relatively light weight arrangement 50 comprising two piezo electric pumps 51, 52 and essentially a piston 54 with cylinder 53 greater reliability can be achieved with less susceptibility to local vibration within a gas turbine engine.

Aspects of the present invention may be utilised with regard to achieving displacement of an actuator 58. As illustrated above typically this displacement in the direction of arrowheads A can be utilised with regard to casings. However, a clearance arrangement 50 in accordance with aspects of the present invention can also be utilised in other situations where a fast or slow actuation is required. Thus for example the displacement could be utilised with regard to fuel nozzles to adjust fuel flow along with compressor blade tip control and in relation to cooling systems and control of valves for fluid control or lubrication.

As indicated above generally the piezo electric pumps 51, 52 will be of substantially the same size. However, it will also be understood that pumps in terms of pump capacity through displacement length into the respective diaphragms 59, 56 may differ in order to again provide different capacities with regard to displacement rates in the direction of arrowheads A in view of pressurisation requirements of the respective volumes 55, 56 through the pumps 51, 52.

As illustrated generally the piston 54 acts as a plunger creating upward or downward movement in the direction of arrowheads A. It may be possible through appropriate shaping of the piston 54 to have a stepped configuration to define different sized volumes for the first volume 55 and the second volume 56 such that the necessary pump volumes to pressurise the respective first volume 55 and second volume 56 may be altered again in order to adjust the capability with regard to displacement upward or downward in the direction of arrowheads A.

Generally, as indicated above a pressure balance is provided between the volumes 55, 56 across the piston 54. This pressurisation is achieved through the pumps 51, 52 and associated one way valves 65, 66. It will also be possible to provide bias potentially in the form of mechanical springs either side of the piston 54. In such circumstances without pressurisation in the respective volumes 55, 56 the piston 54 will be suspended upon the bias such as mechanical springs. In such circumstances should the valves 65, 66 fail the actuator position will be suspended upon the springs. Furthermore, the springs may provide some damping with regard to oscillations of the piston as a result of displacement particularly if the vent valve 67 is of a simple open or shut type, that is to say has a dump nature whereby the piston 54 in such circumstances may move rapidly with the pressurisation in the second volume 56.

Modifications and alterations to aspects of the present invention will be understood by those skilled in the technology. Thus, as indicated generally the piston 54 will slide within the cylinder 53 with a seal association 57. This seal association 57 in such circumstances essentially divides the cylinder 53 into the first volume 55 and the second volume 56. Alternatively, the seal 57 may allow a slow leakage across the volumes 55, 56 again to limit and damp oscillation with regard to the piston in view of displacement one way or the other.

I claim:

1. A gas turbine engine comprising:
   a turbine blade;
   an adjustable casing; and
   a clearance control arrangement, the clearance control arrangement further comprising:
   an actuator operatively connected to a piston within a cylinder, wherein
   the piston divides the cylinder by a sealing engagement with a wall of the cylinder into a first volume and a second volume,
   the first volume is operatively connected to a first piezo electric pump that increases a first pressure in the first volume and the second volume is operatively connected to a second piezo electric pump that increases a second pressure in the second volume, such that a relative displacement of the piston is determined by a pressure balance between the first pressure and the second pressure, and
   at least one of the first volume and the second volume has a vent valve to release the first pressure in the first volume and the second pressure in the second volume to suspend the pressure balance and thereby directly displace the piston by increasing the first pressure in the first volume via the first piezo electric pump or the second pressure in the second volume via the second piezo electric pump.

2. The gas turbine engine as claimed in claim 1 wherein at least one of the first and second piezo electric pumps comprises a piezo ceramic stack.

3. The gas turbine engine as claimed in claim 2 wherein the piezo ceramic stack is operable at a predetermined temperature.

4. The gas turbine engine as claimed in claim 3 wherein the predetermined temperature is above 450° C.

5. The gas turbine engine as claimed in claim 1 wherein the vent valve incorporates a one way valve.

6. The gas turbine engine as claimed in claim 1 wherein each of the first and the second piezo electric pumps includes an inlet and a displaceable diaphragm to compress a fluid such as air which is presented to the corresponding first or second volume of the cylinder through a pump path.

7. The gas turbine engine as claimed in claim 6 wherein the pump path has a cross section determined to be in a predetermined ratio with a cross section of a vent containing the vent valve to facilitate a suspension of the first pressure and the second pressure.

8. The gas turbine engine as claimed in claim 1 wherein a controller provides a plurality of signals to the first and the second piezo electric pumps to determine an operating mode of each of the first and the second piezo electric pumps and the vent valve.

9. The gas turbine engine as claimed in claim 8 wherein the controller communicates with a sensor for the actuator and/or an element displaceable by the actuator whereby the sensor provides an indication of position of the actuator and/or the element displaceable by the actuator.

10. The gas turbine engine as claimed in claim 1 wherein at least one of the first and the second piezo electric pumps is formed from more than one piezo electric stack arranged to act in combination to provide the relative displacement of the piston.

11. The gas turbine engine according to claim 1 wherein the clearance control arrangement is configured in such a way as to maintain a substantially constant clearance amount between the adjustable casing and a tip of the turbine blade.

* * * * *